(12) United States Patent
Matsui et al.

(10) Patent No.: US 10,344,850 B2
(45) Date of Patent: Jul. 9, 2019

(54) SHIFT CONTROL APPARATUS OF AUTOMATIC TRANSMISSION

(71) Applicant: HONDA MOTOR CO., LTD., Tokyo (JP)

(72) Inventors: Hiroki Matsui, Wako (JP); Yasuyuki Masaoka, Wako (JP); Satoshi Yamashita, Wako (JP); Yukari Seto, Wako (JP); Satoshi Igaue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 15/473,265

(22) Filed: Mar. 29, 2017

(65) Prior Publication Data
US 2017/0284538 A1 Oct. 5, 2017

(30) Foreign Application Priority Data
Mar. 31, 2016 (JP) ................................ 2016-072516

(51) Int. Cl.
*F16H 61/02* (2006.01)
*F16H 59/40* (2006.01)
(Continued)

(52) U.S. Cl.
CPC ......... *F16H 61/0204* (2013.01); *F16D 11/14* (2013.01); *F16D 23/02* (2013.01);
(Continued)

(58) Field of Classification Search
CPC ...... F16H 61/0204; F16H 59/40; F16H 59/42; F16H 59/68; F16D 2011/002
(Continued)

(56) References Cited

U.S. PATENT DOCUMENTS 6,056,666 A * 5/2000 Williams ............. B60K 17/344
                                                    180/247
8,192,222 B2   6/2012 Kameyama
(Continued)

FOREIGN PATENT DOCUMENTS

JP   H4-362314 A   12/1992
JP   4029875 B2    10/2007
(Continued)

OTHER PUBLICATIONS

Japanese Office Action dated Sep. 29, 2017, issued in corresponding Japanese Patent Application No. 2016-072516 and partial English translation of the same. (16 pages).

*Primary Examiner* — Ha Dinh Ho
(74) *Attorney, Agent, or Firm* — Thomas | Horstemeyer, LLP

(57) ABSTRACT

A shift control apparatus of an automatic transmission includes: an input detecting unit configured to detect a real rotational speed of the input shaft; an output detecting unit configured to detect a real rotational speed of the output shaft; an estimating unit configured to estimate an estimated rotational speed of the input shaft, which corresponds to a shift request, by multiplying the real rotational speed of the output shaft by a target gear ratio; and a control unit configured to control the rotation of the input shaft based on a detection result from the input detecting unit. The control unit controls the rotation of the input shaft such that an upper-limiting rotational speed of a variation in real rotational speed of the input shaft is lower than the estimated rotational speed.

11 Claims, 9 Drawing Sheets

(51) Int. Cl.
*F16H 59/42* (2006.01)
*F16H 59/68* (2006.01)
*F16D 11/00* (2006.01)
*F16D 11/14* (2006.01)
*F16D 23/02* (2006.01)
*F16H 63/30* (2006.01)
*F16D 23/06* (2006.01)
*F16H 3/091* (2006.01)
*F16H 61/04* (2006.01)

(52) U.S. Cl.
CPC .............. *F16D 23/06* (2013.01); *F16H 59/40* (2013.01); *F16H 59/42* (2013.01); *F16H 59/68* (2013.01); *F16H 63/3023* (2013.01); *F16D 2011/002* (2013.01); *F16D 2011/008* (2013.01); *F16D 2023/0668* (2013.01); *F16D 2023/0693* (2013.01); *F16H 3/091* (2013.01); *F16H 2059/6815* (2013.01); *F16H 2061/0474* (2013.01); *F16H 2063/3096* (2013.01)

(58) Field of Classification Search
USPC .......................................................... 74/335
See application file for complete search history.

(56) References Cited

U.S. PATENT DOCUMENTS

| | | | |
|---|---|---|---|
| 8,960,034 B2 * | 2/2015 | Takahashi | B60K 6/445 74/373 |
| 9,695,933 B2 | 7/2017 | Koga et al. | |
| 2007/0272046 A1 * | 11/2007 | Kawamoto | F16H 59/68 74/335 |
| 2011/0111910 A1 * | 5/2011 | Ideshio | B60K 6/36 475/5 |
| 2013/0244831 A1 * | 9/2013 | Hiasa | F16H 61/04 477/79 |

FOREIGN PATENT DOCUMENTS

| | | |
|---|---|---|
| JP | 2009-85291 A | 4/2009 |
| JP | 2010-27435 A | 2/2010 |
| JP | 2010-281423 A | 12/2010 |
| JP | 2011-241842 A | 12/2011 |
| JP | 2014-119039 A | 6/2014 |
| WO | 2015/068584 A1 | 5/2015 |

\* cited by examiner

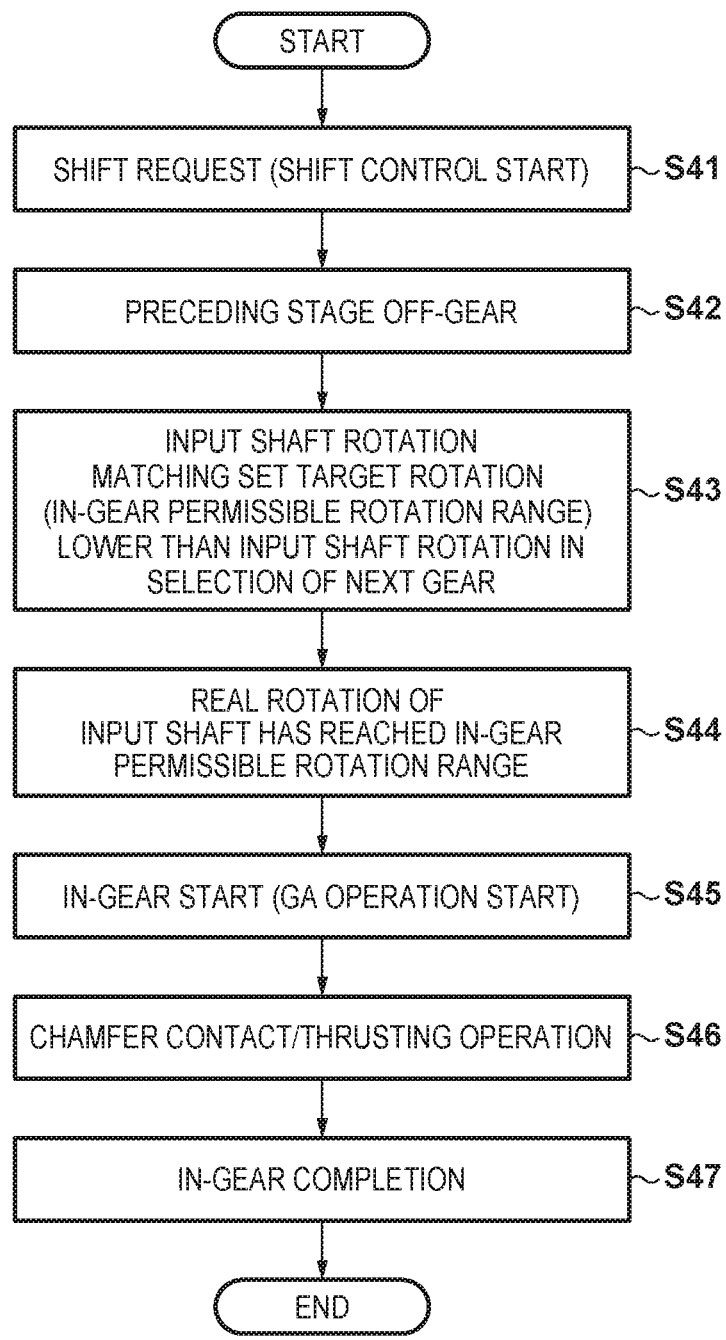

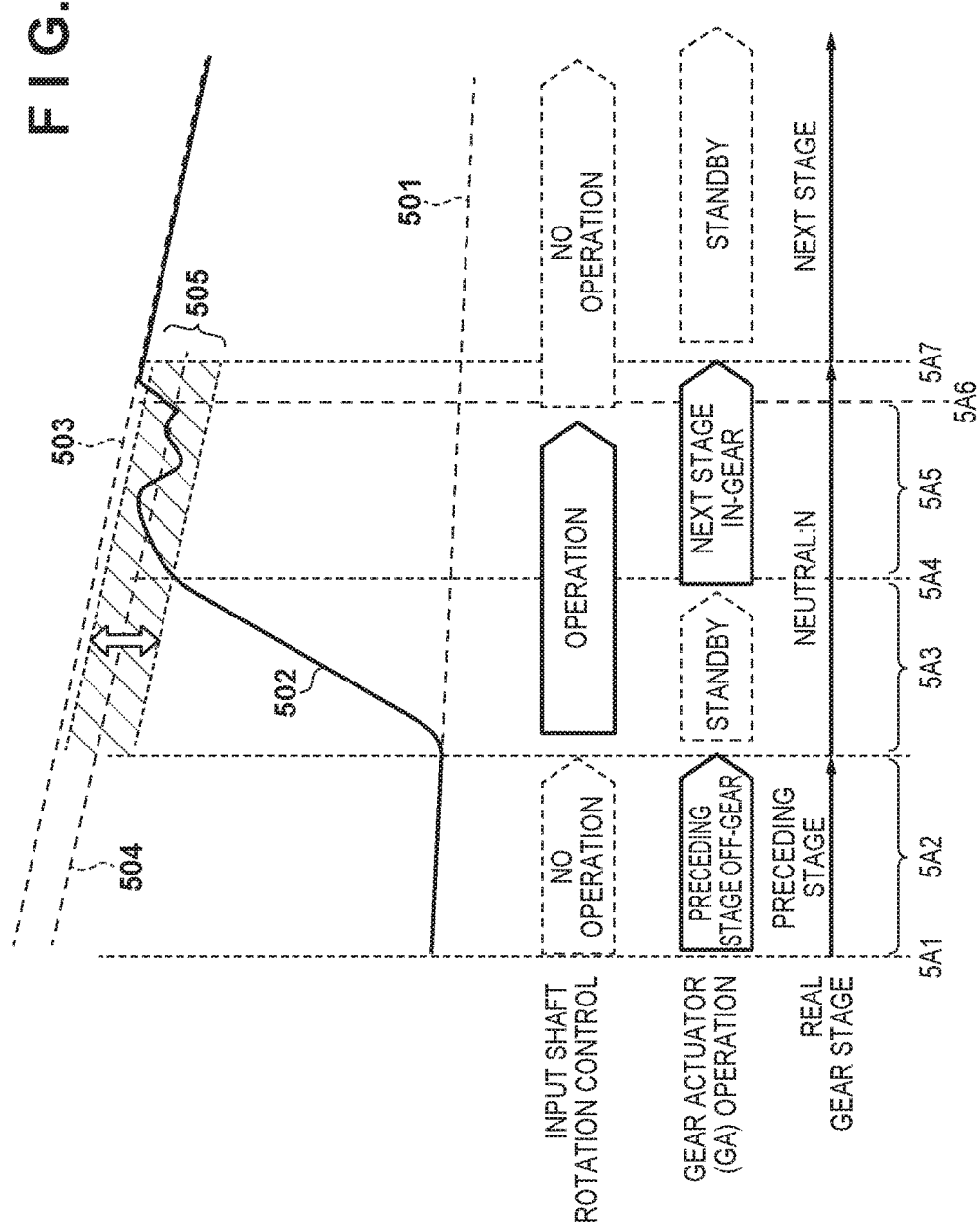

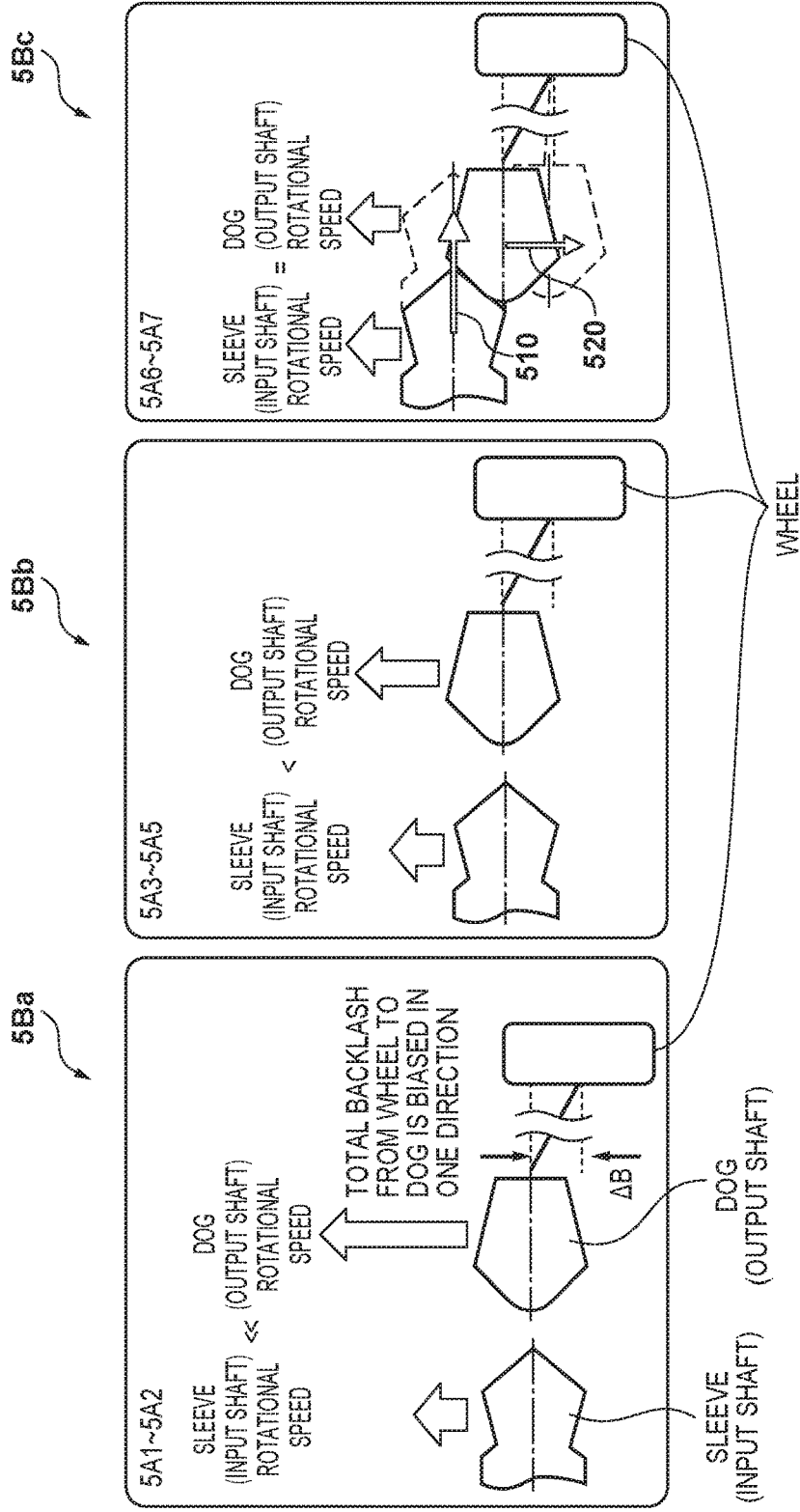

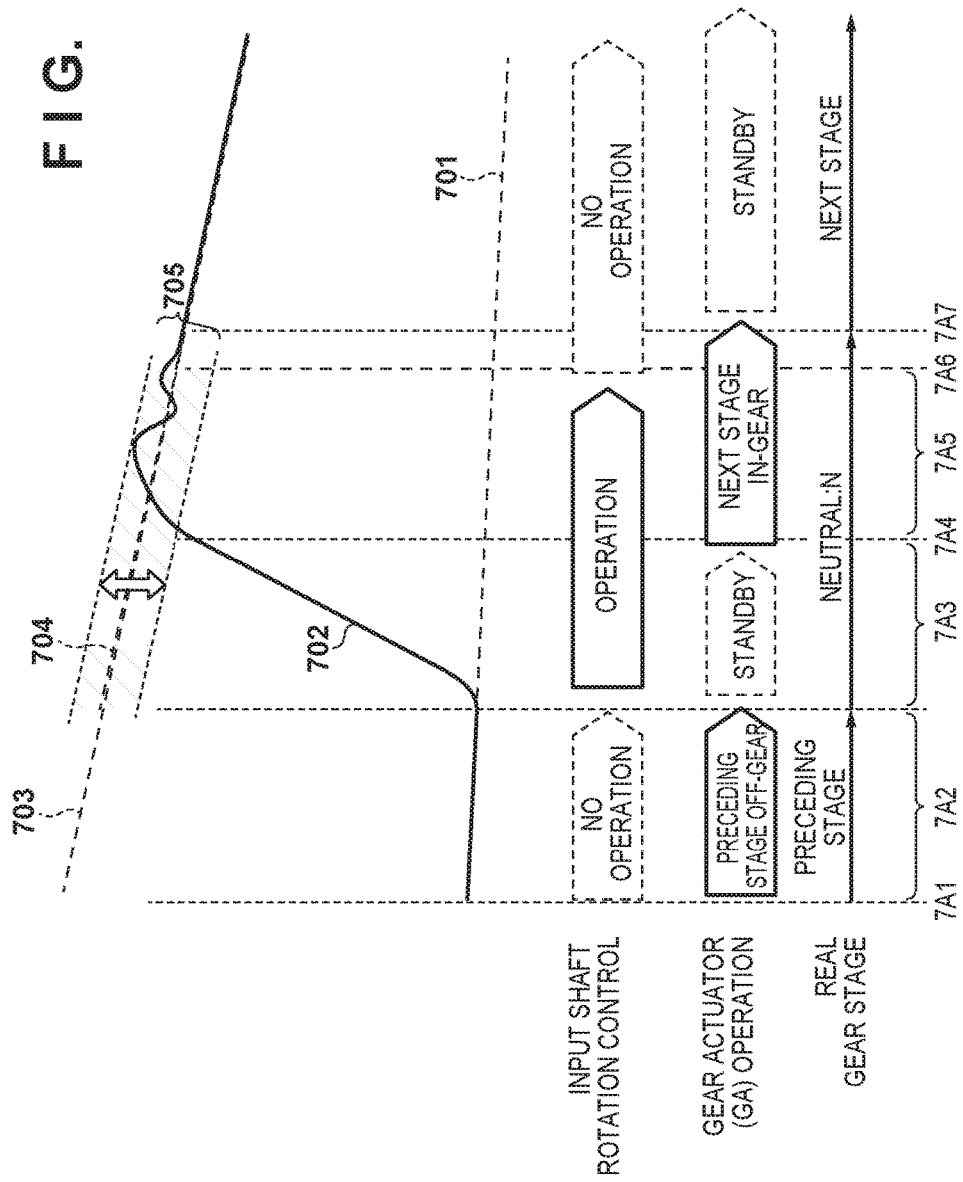

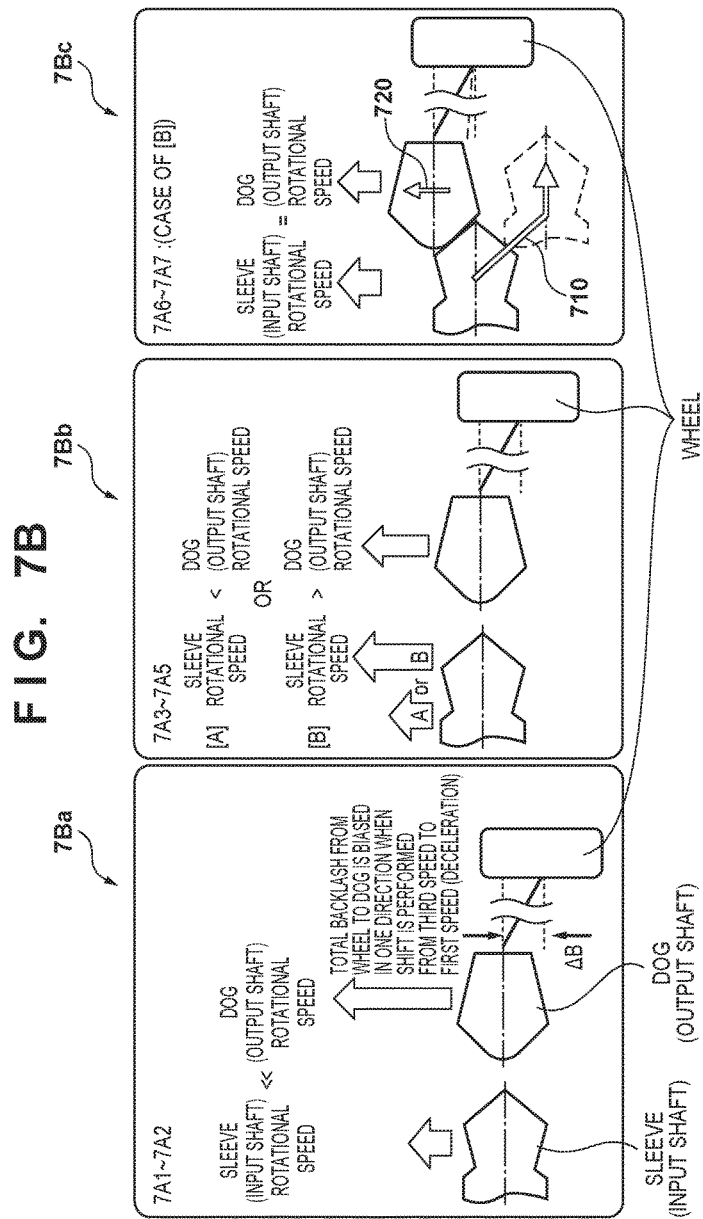

SHIFT CONTROL APPARATUS OF AUTOMATIC TRANSMISSION

CROSS-REFERENCE TO RELATED APPLICATION

This application is based upon and claims the benefit of priority from the prior Japanese Patent Application No. 2016-072516, filed on Mar. 31, 2016, the entire contents of which are incorporated herein by reference.

BACKGROUND OF THE INVENTION

Field of the Invention

The present invention relates to a shift control apparatus of an automatic transmission.

Description of the Related Art

Japanese Patent No. 4029875 has disclosed the arrangement of a vehicle control apparatus which controls engagement of a dog clutch during gear change.

In this arrangement, an internal tooth and external tooth are engaged with each other by simultaneously executing control of moving a sleeve 21 in the axial direction and control of rotating the sleeve 21.

In this arrangement disclosed in Japanese Patent No. 4029875, however, a chamfer 38 and a chamfer 39 come in contact with each other, and the internal tooth and external tooth are engaged while the chamfers 38 and 39 slide against each other. This increases the necessary load of an actuator required to move the sleeve 21 in the axial direction and rotate the sleeve 21.

The present invention has been made in consideration of the above problem, and provides a shift control technique which, when transmitting power by synchronously engaging the input shaft and output shaft of an automatic transmission, can reduce the load of the operation of engaging the input shaft and output shaft.

SUMMARY OF THE INVENTION

The present invention provides a shift control apparatus of an automatic transmission of the first aspect of the present invention that is a shift control apparatus of an automatic transmission configured to output a rotation of an input shaft to an output shaft by shifting the rotation, comprising:

an input detecting unit configured to detect a real rotational speed of the input shaft;

an output detecting unit configured to detect a real rotational speed of the output shaft;

an estimating unit configured to estimate an estimated rotational speed of the input shaft, which corresponds to a shift request, by multiplying the real rotational speed of the output shaft by a target gear ratio; and a control unit configured to control the rotation of the input shaft based on a detection result from the input detecting unit, wherein the control unit controls the rotation of the input shaft such that an upper-limiting rotational speed of a variation in real rotational speed of the input shaft is lower than the estimated rotational speed.

The present invention provides a shift control apparatus of an automatic transmission of the second aspect of the present invention that is a shift control apparatus of an automatic transmission configured to output a rotation of an input shaft to an output shaft by shifting the rotation in accordance with a predetermined shift map, comprising:

an estimating unit configured to estimate an estimated rotational speed of the input shaft, which corresponds to a shift request, based on the shift map;

an input detecting unit configured to detect a real rotational speed of the input shaft;

a setting unit configured to set a target rotational speed lower than the estimated rotational speed such that an upper-limiting rotational speed of a variation in real rotational speed of the input shat is lower than the estimated rotational speed; and a control unit configured to control the rotation of the input shaft based on the target rotational speed and the detection result.

In a shift control apparatus of an automatic transmission of the third aspect of the present invention, wherein the automatic transmission includes a gear coupling mechanism configured to engage a first rotary member of the input shaft and a second rotary member of the output shaft in synchronism with each other via engaging portions thereof, in order to transmit a torque between the first rotary member and the second rotary member rotatable around the same axis, the gear coupling mechanism includes:

a sleeve which includes, as the engaging portion, a plurality of splines arranged along a circumferential direction of an inner circumferential surface, rotates together with the first rotary member by spline-fitting with the first rotary member via the plurality of splines, and is slidable in an axial direction with respect to the first rotary member; and a pushing unit configured to slide the sleeve during the synchronization by pushing the sleeve against the second rotary member, the second rotary member includes, as the engaging portion, a plurality of dog teeth which are arranged along a circumferential direction of an outer circumferential surface of the second rotary member, and mesh with the plurality of splines when the sleeve slides toward the second rotary member, and the control unit controls the pushing unit to start an in-gear operation of sliding the sleeve toward the second rotary member, if it is determined based on the detection result from the input detecting unit that the rotational speed of the input shaft has reached a rotational speed range set lower than the estimated rotational speed.

In a shift control apparatus of an automatic transmission of the fourth aspect of the present invention, wherein in the in-gear operation, the control unit controls the pushing unit, and controls the rotation of the input shaft such that a rotational speed of the plurality of splines of the sleeve obtained via the first rotary member is lower than a rotational speed of the dog tooth of the second rotary member.

In a shift control apparatus of an automatic transmission of the fifth aspect of the present invention, wherein the control unit sets the rotational speed range lower than the estimated rotational speed based on a lower-limiting rotational speed on a minus side with respect to the target rotational speed of the input shaft, and an upper-limiting rotational speed on a plus side with respect to the target rotational speed.

In a shift control apparatus of an automatic transmission of the sixth aspect of the present invention, wherein the dog tooth of the second rotary member and the plurality of splines have chamfers formed on end portions facing each other, and the control unit synchronizes rotations of the first rotary member and the second rotary member by bringing the chamfer formed on the end portion of the plurality of splines into contact with the chamfer formed on the end portion of the dog tooth of the second rotary member.

In a shift control apparatus of an automatic transmission of the seventh aspect of the present invention, wherein the dog tooth of the second rotary member has a backlash biased in one direction based on the rotation of the second rotary member, the control unit controls the pushing unit to further slide the sleeve in the axial direction in the in-gear operation, the chamfer of the dog tooth of the second rotary member is pushed by the chamfer of the plurality of splines as the sleeve slides in the axial direction, and the dog tooth of the second rotary member is configured to be movable within a range of the backlash based on the push.

In the arrangements of the first and third aspects of the present invention, when transmitting power by synchronously engaging the input shaft and output shaft of the automatic transmission, the load of the operation of engaging the input shaft and output shaft can be reduced.

In the arrangements of the third to seventh aspects of the present invention, the load of contact between the engaging portions of the input shaft and output shaft can be reduced in the operation of engaging the input shaft and output shaft.

In the arrangements of the third to seventh aspects of the present invention, it is possible to execute the engaging operation more smoothly by reducing the contact load, thereby reducing the contact noise generated by the contact of the engaging portions in the operation of engaging the input shaft and output shaft.

Further features of the present invention will become apparent from the following description of exemplary embodiments (with reference to the attached drawings).

BRIEF DESCRIPTION OF THE DRAWINGS

FIG. 4 is a flowchart showing a control procedure to be executed by a shift control apparatus according to the embodiment;

FIG. 5A is a timing chart corresponding to the control procedure of the embodiment;

FIG. 5B is a schematic view showing the relative positional relationship between a sleeve-side chamfer and a dog-tooth-side chamfer in the control procedure of the embodiment;

FIG. 7A is a timing chart corresponding to the control procedure of the comparative example; and FIG. 7B is a schematic view showing the relative positional relationship between a sleeve-side chamfer and a dog-tooth-side chamfer in the control procedure of the comparative example.

DESCRIPTION OF THE EMBODIMENTS

Embodiment

An exemplary embodiment of the present invention will be explained in detail below. However, constituent elements described in this embodiment are merely examples, so the technical scope of the present invention is defined by the scope of claims and is not limited by the following individual embodiments.

Figure 1:
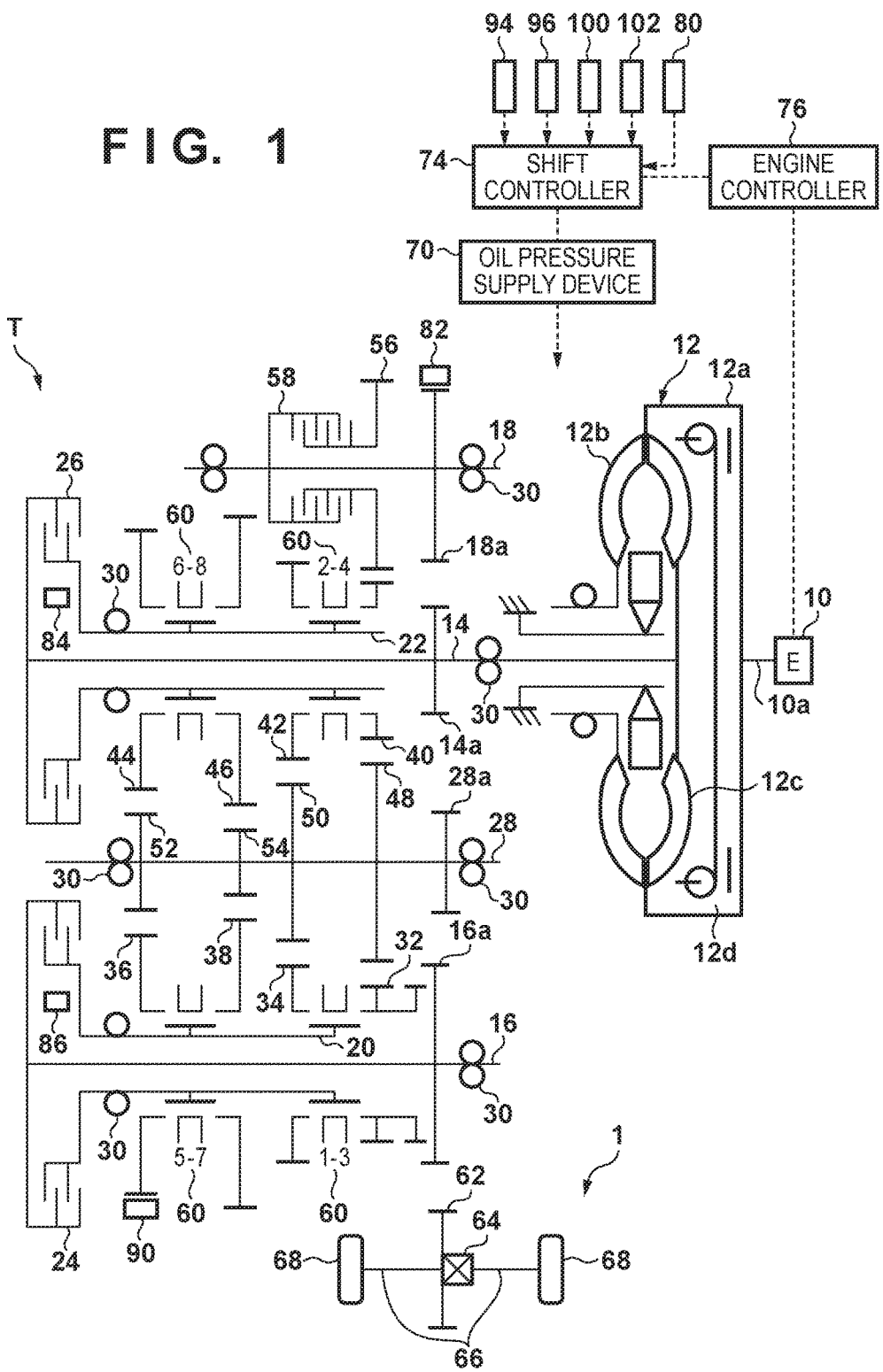
FIG. 1 is a view showing an outline of the configuration of an automatic transmission according to an embodiment.

An automatic transmission shift control apparatus according to the embodiment of the present invention will be explained. FIG. 1 is a view showing an outline of the configuration of the automatic transmission according to the embodiment. In FIG. 1, reference symbol T denotes the transmission. A twin-clutch transmission mounted in a vehicle 1 and having transmission stages of eight forward speeds and one reverse speed will be taken as an example of the transmission T. The transmission T has ranges D, P, R, and N.

The transmission T is connected, via a torque converter 12, to a driving shaft 10a which is connected to the crankshaft of an engine (motor: E) 10. The transmission T includes an even-numbered-stage input shaft (input element) 14 having second, fourth, sixth, and eighth speeds, and also includes an odd-numbered-stage input shaft (input element) 16 having first, third, fifth, and seventh speeds in parallel to the even-numbered-stage input shaft 14. The engine 10 is, for example, a spark ignition internal combustion engine using gasoline as a fuel.

The torque converter 12 includes a pump impeller 12b fixed to a drive plate 12a directly connected to the driving shaft 10a of the engine 10, a turbine runner 12c fixed to the even-numbered-stage input shaft 14, and a lock-up clutch 12d, and the driving force (rotation) of the engine 10 is transmitted to the even-numbered-stage input shaft 14 via the torque converter 12.

An idling shaft 18 is formed in parallel to the even-numbered-stage input shaft 14 and odd-numbered-stage input shaft 16. The even-numbered-stage input shaft 14 is connected to the idling shaft 18 via gears 14a and 18a. Also, the odd-numbered-stage input shaft 16 is connected to the idling shaft 18 via a gear 16a and the gear 18a. The even-numbered-stage input shaft 14, odd-numbered-stage input shaft 16, and idling shaft 18 rotate as the engine 10 rotates.

In addition, a first sub input shaft (input element) 20 and a second sub input shaft (input element) 22 are respectively arranged on the outer circumferential surfaces of the odd-numbered-stage input shaft 16 and even-numbered-stage input shaft 14 so as to be coaxial and relatively rotatable.

The odd-numbered-stage input shaft 16 and first sub input shaft 20 are connected via a first clutch 24, and the even-numbered-stage input shaft 14 and second sub input shaft 22 are connected via a second clutch 26. Each of the first and second clutches 24 and 26 is a multi-plate wet clutch which operates when the pressure (oil pressure) of hydraulic oil is supplied. When the oil pressure is supplied, the first clutch 24 couples (engages) the first sub input shaft 20 with the odd-numbered-stage input shaft 16, and the second clutch 26 couples (engages) the second sub input shaft 22 with the even-numbered-stage input shaft 14.

An output shaft (output element) 28 is placed between the even-numbered-stage input shaft 14 and odd-numbered-stage input shaft 16 in parallel to the even-numbered-stage input shaft 14 and odd-numbered-stage input shaft 16. The even-numbered-stage input shaft 14, odd-numbered-stage input shaft 16, idling shaft 18, and output shaft 28 are rotatably supported by a bearing 30.

A first-speed drive gear 32, a third-speed drive gear 34, a fifth-speed drive gear 36, and a seventh-speed drive gear 38 are fixed to the first sub input shaft 20 on the odd-numbered-stage side, and a second-speed drive gear 40, a fourth-speed drive gear 42, a sixth-speed drive gear 44, and an eighth-speed drive gear 46 are fixed to the second sub input shaft 22 on the even-numbered-stage side.

A first/second-speed driven gear 48 which meshes with the first-speed drive gear 32 and second-speed drive gear 40, and a third/fourth-speed driven gear 50 which meshes with the third-speed drive gear 34 and fourth-speed drive gear 42, are fixed to the output shaft 28. In addition, a fifth/sixth-speed driven gear 52 which meshes with the fifth-speed drive gear 36 and sixth-speed drive gear 44, and a seventh/eighth-speed driven gear 54 which meshes with the seventh-speed drive gear 38 and eighth-speed drive gear 46, are fixed to the output shaft 28.

An RVS (reverse) idling gear 56 which meshes with the first/second-speed driven gear 48 fixed to the output shaft 28 is rotatably supported by the idling shaft 18. The idling shaft 18 and RVS idling gear 56 are connected via an RVS clutch 58. Like the first and second clutches 24 and 26, the RVS clutch 58 is a multi-plate wet clutch which operates when the oil pressure is supplied.

A first/third-speed gear coupling mechanism 60 (1-3) for selectively coupling (fixing) the first-speed drive gear 32 and third-speed drive gear 34 to the first sub input shaft 20 is arranged for the odd-numbered-stage input shaft 16. Also, a fifth/seventh-speed gear coupling mechanism 60 (5-7) for selectively coupling (fixing) the fifth-speed drive gear 36 and seventh-speed drive gear 38 to the first sub input shaft 20 is arranged for the odd-numbered-stage input shaft 16.

A second/fourth-speed gear coupling mechanism 60 (2-4) for selectively coupling (fixing) the second-speed drive gear 40 and fourth-speed drive gear 42 to the second sub input shaft 22 is arranged for the even-numbered-stage input shaft 14. Also, a sixth/eighth-speed gear coupling mechanism 60 (6-8) for selecting coupling (fixing) the sixth-speed drive gear 44 and eighth-speed drive gear 46 to the second sub input shaft 22 is arranged for the even-numbered-stage input shaft 14. The four gear coupling mechanisms will generally be denoted by reference numeral 60.

When the first clutch 24 or second clutch 26 is coupled (engaged), the driving force of the engine 10 is transmitted from the odd-numbered-stage input shaft 16 to the first sub input shaft 20 or from the even-numbered-stage input shaft 14 to the second sub input shaft 22, and further transmitted to the output shaft 28 via the above-mentioned drive gears and driven gears.

Note that in a reverse operation, the driving force of the engine 10 is transmitted to the output shaft 28 via the even-numbered-stage input shaft 14, gear 14*a*, gear 18*a*, RVS clutch 58, idling shaft 18, RVS idling gear 56, and first/second-speed driven gear 48. The output shaft 28 is connected to a differential mechanism 64 via a gear 62, and the differential mechanism 64 is connected to wheels 68 via drive shafts 66.

The gear coupling mechanism 60 operates on the basis of a shift force supplied by a gear actuator (for example, an electromagnetic motor or hydraulic actuator). An oil pressure supply device 70 supplies the oil pressure (shift force) to the gear coupling mechanism 60, first and second clutches 24 and 26, and RVS clutch 58.

The transmission T includes a shift controller 74. The shift controller 74 is formed as an electronic control unit (ECU) including a microcomputer. The transmission T also includes an engine controller 76 formed by an electronic control unit similarly including a microcomputer for controlling the operation of the engine 10. The gear coupling mechanism 60 can operate by a gear actuator (for example, an electromagnetic motor or hydraulic actuator which supplies the shift force to the shift fork of the gear coupling mechanism 60) operated based on control of the shift controller 74.

The shift controller 74 can communicate with an engine controller 76, and acquires information such as the engine speed, throttle position, and accelerator position (AP) from the engine controller 76.

Magnetic members are attached to fork shafts 60*f* fixed to the shift forks of the four gear coupling mechanisms 60. Stroke sensors (shift position sensors) 80 are arranged near the attached magnetic members. The stroke sensor (shift position sensor) 80 senses an output (voltage value) indicating a stroke (movement) in the axial direction of the shift fork, in other words, a sleeve 60*g*. More specifically, the stroke sensor (shift position sensor) 80 senses an output (voltage value) indicating the position of an in-gear state in which a spline 60*g*1 of the sleeve 60*g* engages with a dog tooth 321 of the first-speed drive gear 32, or the position of an in-gear state in which the spline 60*g*1 engages with a dog tooth 341 of the third-speed drive gear 34, and the position of an off-gear state in which the engagement is canceled. The sensing result of the stroke sensor (shift position sensor) 80 is fed back to the shift controller 74.

Furthermore, first, second, third, and fourth rotational speed sensors 82, 84, 86, and 90 are arranged in the transmission T. The first rotational speed sensor 82 outputs a signal indicating an input rotational speed NM of the transmission T. The second rotational speed sensor 84 outputs a signal indicating the rotational speed of the second sub input shaft 22. The third rotational speed sensor 86 outputs a signal indicating the rotational speed of the first sub input shaft 20. The fourth rotational speed sensor 90 outputs a signal indicating a rotational speed (the output rotational speed of the transmission T) NC of the output shaft 28 (in other words, a vehicle speed V). The first, second, third, and fourth rotational speed sensors 82, 84, 86, and 90 output the sensed signals to the shift controller 74.

First and second pressure sensors 94 and 96 are arranged along oil passages in the oil pressure supply device 70, which are connected to the first and second clutches 24 and 26. The first and second pressure sensors 94 and 96 output, to the shift controller 74, signals indicating the pressures (oil pressures) of hydraulic oil ATF to be supplied to the first and second clutches 24 and 26. A temperature sensor 100 is arranged near a reservoir 70*a* (FIG. 2), and outputs a signal indicating an oil temperature (the temperature of the hydraulic oil ATF) TATF to the shift controller 74.

Also, a range selector position sensor 102 is arranged near a range selector (not shown) arranged in the driver's seat of the vehicle 1, and outputs, to the shift controller 74, a signal indicating a range operated (selected) by the driver from ranges P, R, N, and D arranged on the range selector in this order from above when viewed from the driver.

Based on these sensor outputs and the information obtained by communication with the engine controller 76, the shift controller 74 controls the operations of the first and second clutches 24 and 26 and gear coupling mechanisms 60 by exciting and demagnetizing first to sixth linear solenoid valves (70*f* to 70*k*), thereby controlling the overall operation of the transmission T.

In accordance with the running state defined by the running speed (vehicle speed) V of the vehicle 1 and the position (accelerator position) AP of the accelerator pedal and in accordance with the shift map (not shown), the shift controller 74 controls the operation of the transmission T so as to shift and output the driving force of the engine 10 by the changed gear stage based on the control of the four gear coupling mechanisms 60 and first and second clutches 24 and 26. The shift map contains information indicating the input shaft rotational speed in each gear position, so the engine controller 76 can obtain the estimated rotational speed of the input shaft, which corresponds to a shift request, based on the shift map.

Note that the above-mentioned twin-clutch transmission is not limited to the configuration shown in the drawings, and can have any configuration as long as the above-mentioned gear coupling mechanisms are included. In addition, an engine (internal combustion engine) is taken as an example of the motor, but the present invention is not limited to this and also applicable to a hybrid of an engine and electric motor or an electric motor.

Figure 2:
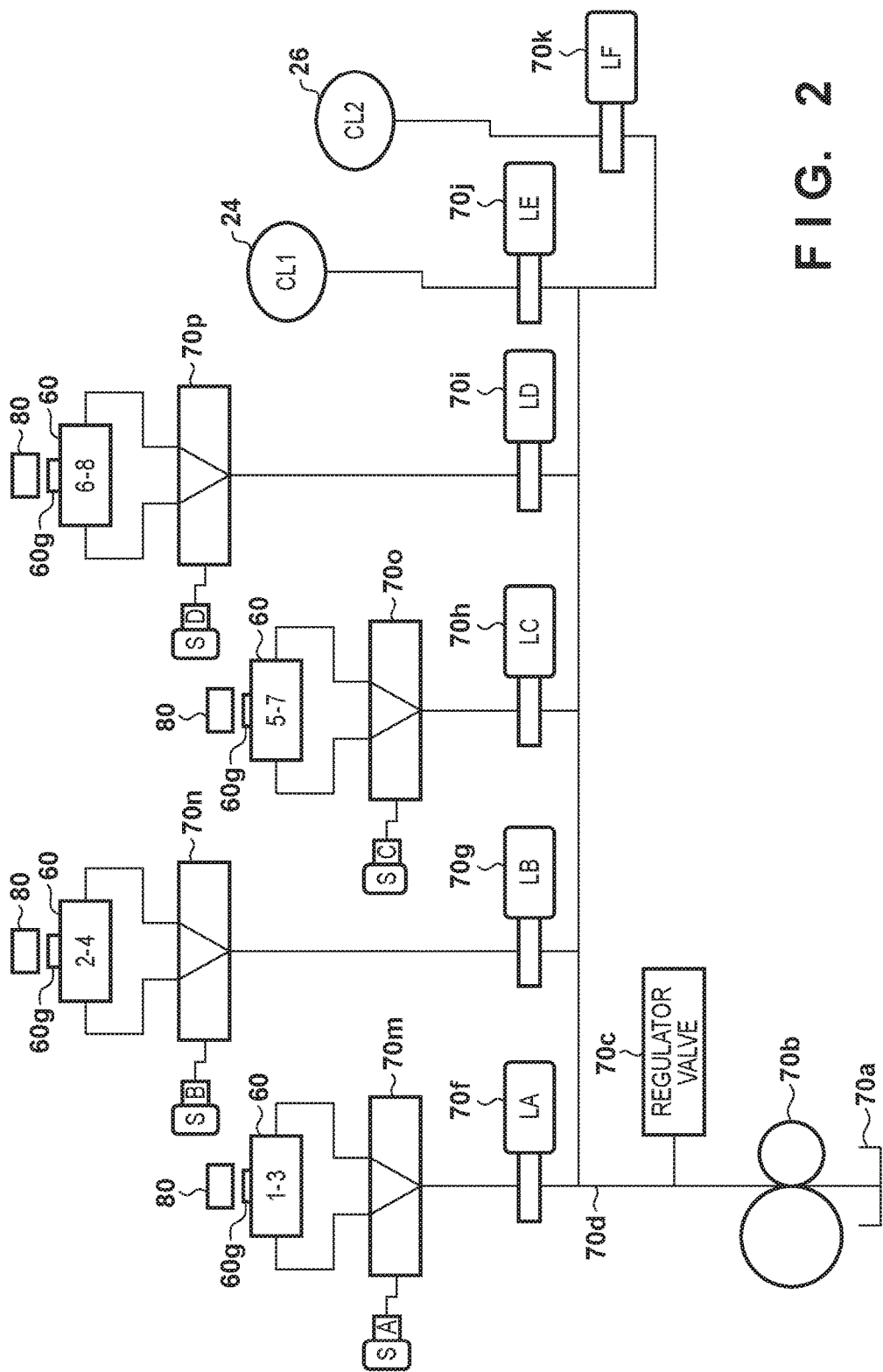
FIG. 2 is a hydraulic circuit diagram showing the arrangement of an oil pressure supply device according to the embodiment.

FIG. 2 is a hydraulic circuit diagram showing the configuration of the oil pressure supply device 70. In the oil pressure supply device 70 shown in FIG. 2, the discharge pressure (oil pressure) of the hydraulic oil ATF pumped up from the reservoir 70a storing the hydraulic oil ATF by a hydraulic pump (oil supply pump) 70b via a strainer (not shown) is regulated to a line pressure PL by a regulator valve (pressure regulating valve) 70c.

Although not shown, the hydraulic pump 70b is connected to the pump impeller 12b of the torque converter 12 via a gear, and hence operates when driven by the engine 10.

The regulated line pressure is supplied from an oil passage 70d to the input ports of the first linear solenoid valve (LA) 70f, second linear solenoid valve (LB) 70g, third linear solenoid valve (LC) 70h, fourth linear solenoid valve (LD) 70i, fifth linear solenoid valve (LE) 70j, and sixth linear solenoid valve (LF) 70k.

The first, second, third, fourth, fifth, and sixth linear solenoid valves (70f, 70g, 70h, 70i, 70j, and 70k) are hydraulic control valves (electromagnetic control valves), and each valve moves a spool in proportion to the amount of electric current, thereby linearly changing the output pressure from an output port. In addition, each of the first, second, third, fourth, fifth, and sixth linear solenoid valves (70f, 70g, 70h, 70i, 70j, and 70k) is configured as an N/C (Normal Close) valve in which the spool moves to an open position when an electric current is supplied.

The output port of the first linear solenoid valve (LA) 70f is connected to the piston chamber of the first/third-speed gear coupling mechanism 60 (1-3) via a first servo shift valve 70m. The output port of the second linear solenoid valve (LB) 70g is connected to the piston chamber of the second/fourth-speed gear coupling mechanism 60 (2-4) via a second servo shift valve 70n.

The output port of the third linear solenoid valve (LC) 70h is connected to the piston chamber of the fifth/seventh-speed gear coupling mechanism 60 (5-7) via a third servo shift valve 70o. The output port of the fourth linear solenoid valve (LD) 70i is connected to the piston chamber of the sixth/eighth-speed gear coupling mechanism 60 (6-8) via a fourth servo shift valve 70p.

The servo shift valves 70m, 70n, 70o, and 70p are respectively connected to ON/OFF solenoid valves (hydraulic control valves (electromagnetic control valves)) SA, SB, SC, and SD. In accordance with excitation and demagnetization of the solenoids, the servo shift valves output the oil pressure input from the first to fourth linear solenoid valves (70f, 70g, 70h, and 70i) as a line pressure from one of output ports (left and right output ports in FIG. 2).

Figure 3:
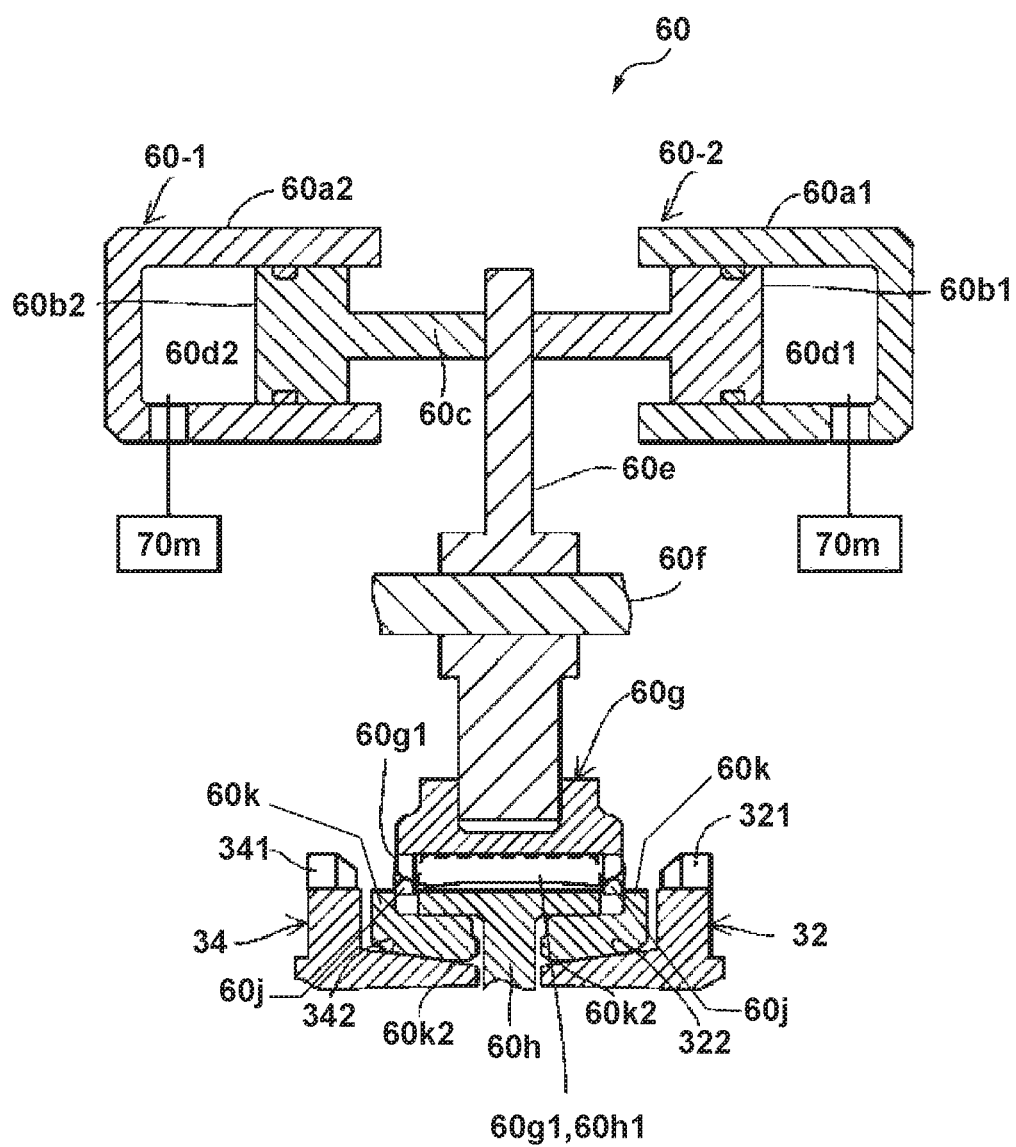
FIG. 3 is a view showing the arrangement of a gear coupling mechanism according to the embodiment.

FIG. 3 is a schematic sectional view showing the structure of the gear coupling mechanism 60. FIG. 3 shows the structure of the first/third-speed gear coupling mechanism 60 (1-3) of the four gear coupling mechanisms 60 as an example. In this example, hydraulic actuators (60-1 and 60-2) are installed as gear actuators for supplying the axial-direction shift force to a shift fork 60e of the gear coupling mechanism 60 (1-3). However, the present invention is not limited to this example, and the hydraulic actuators (60-1 and 60-2) as gear actuators may also be replaced with electromagnetic motors.

In the gear coupling mechanism 60 as shown in FIG. 3, pistons, more specifically, a first-speed piston 60b1 and a third-speed piston 60b2 are arranged to oppose each other on the right and left sides in cylinders 60a1 and 60a2. The first-speed piston 60b1 and third-speed piston 60b2 are connected by a common piston rod 60c, and can move to the right and left in accordance with oil pressure supply to a first-speed piston chamber 60d1 and a third-speed piston chamber 60d2.

The shift fork 60e is connected to the piston rod 60c, and fixed to the fork shaft 60f. As shown in FIG. 3, the shift fork 60e is connected to the sleeve 60g. The sleeve 60g is formed into an annular shape, and the plurality of splines 60g1 are periodically formed along the circumferential direction of the inner circumferential surface. A hub 60h is attached to the first sub input shaft 20 by spline-fitting, and held in a rotatable state with respect to the first sub input shaft 20 by using a collar or bearing (not shown). A plurality of splines 60h1 are periodically formed along the circumferential direction of the outer circumferential surface of the hub 60h. Since the splines 60g1 of the annular sleeve 60g mesh with the splines 60h1 of the hub 60h, the sleeve 60g can slide in the axial direction with respect to the hub 60h. The hub 60h is coupled with and accommodated in the inner circumferential side of the sleeve 60g by the splines 60g1 and 60h1. The first-speed drive gear 32 and third-speed drive gear 34 are arranged on the two sides of the hub 60h via a spring 60j and a blocking ring 60k. Also, a tapered cone surface 60k2 is formed on the blocking ring 60k, and tapered cone surfaces 322 and 342 corresponding to the tapered cone surface 60k2 of the blocking ring 60k are formed on the first-speed drive gear 32 and third-speed drive gear 34.

Inclined surfaces (chamfers) having inclined end portions are formed on the right and left end portions of the splines 60g1 of the sleeve 60g. Also, dog teeth 321 and 341 are respectively formed on the first-speed drive gear 32 and third-speed drive gear 34, an inclined surface (chamfer) is formed on the left end portion of the tog tooth 321 of the first-speed drive gear 32, and an inclined surface (chamfer) is formed on the right end portion of the dog tooth 341 of the third-speed drive gear 34. The state shown in FIG. 3 is a neutral state. When the shift fork 60e moves and the spline 60g1 of the sleeve 60g engages with the dog tooth 321 of the first-speed drive gear 32, a first-speed gear stage is established. When the spline 60g1 of the sleeve 60g engages with the dot tooth 341 of the third-speed drive gear 34, a third-speed gear stage is established.

Next, the operation of the first/third-speed gear coupling mechanism 60 (1-3) will be explained. FIG. 4 is a flowchart showing a control procedure to be executed by the shift control apparatus of this embodiment. FIG. 5A is a timing chart corresponding to the control procedure. FIG. 5B is a schematic view showing the relative positional relationship between the chamfer of the sleeve 60g and the chamfer of the dog tooth 321. FIG. 5B shows a case in which the splines 60g1 of the sleeve 60g engage with the dog tooth 321 of the first-speed drive gear 32 as an example. Referring to FIG. 5B, the chamfer formed on the right end portion of the spline 60g1 of the sleeve 60g is shown as "a sleeve (input shaft)" for the sake of simplicity. Likewise, the chamfer formed on the left end portion of the dog tooth 321 of the first-speed drive gear 32 is shown as "a dog (output shaft)" for the sake of simplicity. "The dog (output shaft)" is connected to the wheel 68 via the first-speed drive gear 32, first/second-speed driven gear 48, output shaft 28, gear 62, differential mechanism 64, and drive shaft 66.

Note that FIGS. 5A and 5B exemplarily show shift control of down-shift from the third speed to the first speed by taking the operation of the first/third-speed gear coupling mechanism 60 (1-3) as an example. However, shift control to be executed by the shift control apparatus according to the embodiment is not limited to this example and similarly applicable to shift control for acceleration. This applies to the gear coupling mechanisms 60 (5-7), 60 (2-4), and 60 (6-8).

(Step S41)

When a shift request is input in step S41 of FIG. 4, the shift controller 74 starts shift control. This process in step S41 corresponds to process 5A1 in the timing chart shown in FIG. 5A. At the timing of process 5A1, the actual gear stage (real gear stage) is an in-gear gear stage (preceding stage). For example, the first/third-speed gear coupling mechanism 60 (1-3) is in a state (in-gear state) in which it is engaged with the Hi-side gear (third-speed drive gear 34).

At the timing of process 5A1, the engine controller 76 has not executed rotation control of the input shaft (first sub input shaft 20), and the gear actuator (Ga) is not in operation.

In the timing chart of FIG. 5A, a broken line 501 indicates the rotational speed of the input shaft in selection of the preceding stage, and a solid line 502 indicates the real rotational speed of the input shaft. At the timing of process 5A1, the gear stage in selection of the preceding stage is in the in-gear state, so the real rotational speed of the input shaft indicated by the solid line 502 is a rotational speed synchronized with the rotational speed of the input shaft indicated by the broken line 501 in selection of the preceding stage.

In step S42, the shift controller 74 operates the gear coupling mechanism 60 under control of the gear actuator (GA), thereby shifting the in-gear state of the preceding stage to an off-gear state (preceding-stage off-gear). That is, the gear actuator (GA) operates the first/third-speed gear coupling mechanism 60 (1-3) so as to disengage the Hi-side gear (the third-speed drive gear 34). The off-gear state is established when disengagement is complete.

(Step S42)

This process in step S42 corresponds to process 5A2 in the timing charge of FIG. 5A. Until shift from the in-gear stage of the preceding stage to the off-gear stage is complete, the actual gear stage (real gear stage) is the gear stage of the preceding stage. At the timing of process 5A2, the engine controller 76 executes no input shaft rotation control (no operation), and the real rotational speed of the input shaft indicated by the solid line 502 is a rotational speed synchronized with the rotational speed of the input shaft in selection of the preceding stage, which is indicated by the broken line 501.

In process 5A2 corresponding to step S42, the shift controller 74 operates the gear coupling mechanism 60 by controlling the gear actuator (GA). That is, the shift controller 74 operates the gear coupling mechanism 60 by controlling the gear actuator (GA) so as to shift the gear stage of the preceding stage in the in-gear state to the off-gear state. For example, the shift controller 74 moves the sleeve 60g (FIG. 3) to the right on the drawing surface via the shift fork 60e of the gear coupling mechanism 60 by controlling the gear actuator (GA). This movement of the sleeve 60g cancels meshing between the dog tooth 341 of the third-speed drive gear 34 and the spline 60g1 of the sleeve 60g.

5Ba in FIG. 5B schematically shows the relative positional relationship between the chamfer on the sleeve (input shaft) side and that on the dog (output shaft) side in steps S41 and S42 of the control procedure shown in FIG. 4 (processes 5A1 and 5A2 in FIG. 5A). The rotational speed of the dog (output shaft) is higher than that of the sleeve (input shaft) (differential rotation: large). Also, the first-speed drive gear 32, first/second-speed driven gear 48, output shaft 28, gear 62, differential mechanism 64, and drive shaft 66 are arranged between the dog (output shaft) and the wheel 68, and the total backlash of the individual elements from the dog (output shaft) to the wheel is biased in one direction. The chamfer on the sleeve (input shaft) side and that on the dog (output shaft) side have not come in contact with each other yet.

(Step S43)

In step S43, the engine controller 76 performs rotation control so that the rotational speed of the input shaft matches a predetermined rotational speed. This process in step S43 corresponds to process 5A3 in the timing chart of FIG. 5A. In this step, the engine controller 76 sets the target rotational speed of the input shaft under rotation control lower than the rotational speed of the input shaft in selection of the next stage. For example, the shift controller 76 sets the target rotational speed lower than the rotational speed of the input shaft in selection of the next stage, so that the upper-limiting rotational speed of the variation in input shaft real rotation is lower than the rotational speed of the input shaft in selection of the next stage. The engine controller 76 holds, as learning data, data of the upper-limiting rotational speed of the real rotation variation based on the sensing results from the first, second, and third rotational speed sensors 82, 84, and 86, and can determine a predetermined setting parameter based on the held data. For example, when the predetermined setting parameter is $0<\alpha<1$, the engine controller 76 can obtain the target rotational speed by multiplying, by the predetermined setting parameter, the obtained rotational speed of the input shaft in selection of the next stage.

The first, second, and third rotational speed sensors 82, 84, and 86 are arranged in the transmission T of this embodiment, and each function as an input shaft rotation detector which detects the real rotational speed of the input shaft. The fourth rotational speed sensor 90 is also arranged in the transmission T, and functions as an output shaft rotation detector which detects the real rotational speed of the output shaft 28.

The engine controller 76 estimates the rotational speed of the input shaft (in selection of the next stage) based on the real rotational speed of the output shaft and the target gear ratio. The engine controller 76 can estimate the rotational speed of the input shaft based on an estimating calculation which multiplies the real rotational speed of the output shaft by the target gear ratio.

In the timing chart of FIG. 5A, a broken line 503 indicates the rotational speed of the input shaft in selection of the next stage, and a broken line 504 indicates the target rotational speed of the input shaft under rotation control. For example, when performing shift-down from the third speed to the first speed by operating the first/third-speed gear coupling mechanism 60 (1-3), the rotational speed of the input shaft in selection of the next stage is the rotational speed of the input shaft in selection of a Low-side gear stage (the first-speed drive gear 32). The engine controller 76 can obtain the rotational speed of the input shaft in selection of the next stage based on the above estimating calculation. Obtaining of the input shaft rotational speed in selection of the next stage is not limited to this example. For example, the rotational speed of the input shaft in selection of the next stage is obtainable based on a preset shift map.

The target rotational speed of the input shaft indicated by the broken line 504 is set at a rotational speed lower than the rotational speed of the input shaft in selection of the next stage indicated by the broken line 503. The engine controller 76 can set the target rotational speed indicated by the broken line 504 by multiplying, by the predetermined setting parameter ($0<\alpha<1$), the rotational speed of the input shaft in selection of the next stage indicated by the broken line 503.

The engine controller 76 can determine an in-gear permissible rotation range 505 by setting a predetermined range (target rotational speed±β) for the target rotational speed. By using the target rotational speed of the input shaft indicated by the broken line 504 as a median, for example, the engine controller 76 can set, as the in-gear permissible rotation range 505 in which in-gear operation start is permitted, a rotational speed range determined by the lower limit (target rotational speed−β) on the minus side with respect to the target rotational speed and the upper limit (target rotational speed+β) on the plus side with respect to the target rotational speed. The upper-limiting rotational speed of the in-gear permissible rotation range 505 is set at a rotational speed lower than the rotational speed of the input shaft in selection of the next stage indicated by the broken line 503.

In process 5A3, the actual gear stage is neutral (N), and the gear actuator (GA) is not in operation in a standby state. Also, input shaft rotation control by the engine controller 76 is in operation, and the actual rotational speed of the input shaft rises toward the in-gear permissible rotation range 505 (the solid line 502).

Even when the real rotational speed of the input shaft varies and overshoots with respect to the target rotational speed (the broken line 504) of the input shaft, the engine controller 76 performs input shaft rotation control such that the upper limit of the variation becomes smaller than the upper-limiting rotational speed of the in-gear permissible range 505.

(Step S44)

In step S44, the engine controller 76 determines whether the real rotational speed of the input shaft has reached the in-gear permissible rotation range 505 based on the detection results from the input shaft rotation detectors (the first, second, and third rotational speed sensors 82, 84, and 86). If the real rotational speed of the input shaft has not reached the in-gear permissible rotation range 505, the engine controller 76 continues input shaft rotation control by engine control. For example, at the timing from process 5A2 to process 5A3 in FIG. 5A, the real rotational speed of the input shaft has not reached the in-gear permissible rotation range 505, so the shift controller 74 sets the gear actuator in the standby state, and the engine controller 76 continues input shaft rotation control. If the real rotational speed of the input shaft has reached the in-gear permissible rotation range 505 in step S44, the engine controller 76 advances the process to step S45.

The timing chart in FIG. 5A shows a state in which the real rotational speed of the input shaft has reached the lower-limiting rotational speed of the in-gear permissible rotation range 505 at the timing of process 5A4.

(Step S45)

In step S45, the shift controller 74 operates the gear coupling mechanism 60 based on control of the gear actuator (GA) in order to shift the present neutral state to the in-gear state of the next stage (next-stage in-gear start). This process in step S45 corresponds to process 5A5 in the timing charge of FIG. 5A.

The shift controller 74 further moves the sleeve 60g from the neutral position to the right on the drawing surface via the shift fork 60e of the gear coupling mechanism 60 by controlling the gear actuator (GA). Since the sleeve 60g thus moves, the spline 60g1 of the sleeve 60g moves in the axial direction and approaches the dog tooth 321 of the first-speed drive gear 32.

In parallel to control of the gear actuator (GA) by the shift controller 74, the engine controller 76 performs rotation control so as to set the real rotational speed (the solid line 502) of the input shaft at the target rotational speed of the input shaft indicated by the broken line 504 (within the in-gear permissible rotation range 505). For example, if a deviation of the real rotational speed (the solid line 502) of the input shaft with respect to the target rotational speed of the input shaft indicated by the broken line 504 becomes equal to or smaller than a predetermined value, the engine controller 76 determines that setting is complete, and sets input shaft rotation control in a non-operation state. If it is determined that setting is complete, the process advances to step S46.

5Bb in FIG. 5B schematically shows the relative positional relationship between the chamfer on the sleeve (input shaft) side and that on the dog (output shaft) side in steps S43, S44, and S45 of the control procedure shown in FIG. 4 (processes 5A3 to 5A5 in FIG. 5A). The rotational speed of the sleeve (input shaft) further increases from the state shown in 5Ba of FIG. 5B due to rotation control by the engine controller 76, and the differential rotation between the rotational speed of the sleeve (input shaft) and that of the dog (output shaft) reduces. However, the rotational speed of the dog (output shaft) is higher than that of the sleeve (input shaft) (differential rotation: small). The chamfer on the sleeve (input shaft) side and that on the dog (output shaft) side have not come in contact with each other yet, and the total backlash of the individual elements from the dog (output shaft) to the wheel is biased in one direction.

(Step S46)

Referring to FIG. 4 again, in step S46, the shift controller 74 executes a chamfer contact/thrusting operation by controlling the gear actuator (GA). In the timing chart of FIG. 5A, the shift controller 74 executes the chamfer contact/thrusting operation at the timing of process 5A6. The shift controller 74 further moves the sleeve 60g to the right on the drawing surface via the shift fork 60e of the gear coupling mechanism 60 by controlling the gear actuator (GA). This movement of the sleeve 60g brings the inclined surface (chamfer) formed on the right end portion of the spline 60g1 of the sleeve 60g into contact with the inclined surface (chamfer) formed on the left end portion of the dog tooth 321 of the first-speed drive gear 32. The chamfer of the spline 60g1 of the sleeve 60g and that of the dog tooth 321 come in contact with each other in a state in which the rotational speed of the sleeve 60g (the input shaft) is always lower than that of the dog tooth 321 (the output shaft).

Since the chamfer of the sleeve 60*g* and that of the dog tooth 321 come in contact with each other, the differential rotation between the rotational speed of the sleeve 60*g* (the input shaft) and that of the dog tooth 321 (the output shaft) is eliminated. That is, the rotational speed of the sleeve 60*g* (the input shaft) and that of the dog tooth 321 (the output shaft) have the same value.

In this state in which there is no differential rotation between the rotational speed of the sleeve 60*g* (the input shaft) and that of the dog tooth 321 (the output shaft), the shift controller 74 further moves the sleeve 60*g* to the right on the drawing surface by controlling the gear actuator (GA). Since the sleeve 60*g* thus moves, the chamfer of the spline 60*g*1 of the sleeve 60*g* starts thrusting the chamfer of the dog tooth 321 of the first-speed drive gear 32. This thrust on the chamfer of the dog tooth 321 by the chamfer of the spline 60*g*1 progresses in accordance with the movement of the sleeve 60*g*.

(Step S47)

In step S47, since thrust on the chamfer of the dog tooth 321 by the chamfer of the spline 60*g*1 progresses, the spline 60*g*1 of the sleeve 60*g* and the dog tooth 321 of the first-speed drive gear 32 are meshed and integrated with each other, thereby completing shift to the in-gear state (in-gear completion).

5Bc in FIG. 5B schematically shows the relative positional relationship between the chamfer of the sleeve (input shaft) and that of the dog (output shaft) in steps S46 and S47 of the control procedure shown in FIG. 4 (processes 5A6 and 5A7 in FIG. 5A).

In a state immediately before the chamfers come in contact with each other, the rotational speed of the dog (output shaft) is higher than that of the sleeve (input shaft). Therefore, the chamfer (a preceding chamfer (not shown)) of the dog (output shaft) positioned in the upper portion of FIG. 5B rotates with no contact with the chamfer of the sleeve (input shaft) shown in 5Bc of FIG. 5B. A succeeding chamfer (shown in 5Bc of FIG. 5B) of the dog (output shaft) following the preceding chamfer (not shown) catches the chamfer of the sleeve (input shaft) shown in 5Bc of FIG. 5B based on the differential rotation, and comes in contact with the chamfer of the sleeve (input shaft) while advancing to the right along the axial direction. That is, in a state in which there is a differential rotation of rotational speed of dog (output shaft)>rotational speed of sleeve (input shaft), the chamfer of the dot (output shaft) easily comes in contact with the chamfer of the sleeve (input shaft) in the state as shown in 5Bc of FIG. 5B.

In the state shown in 5Ba and 5Bb of FIG. 5B, the total backlash of the individual elements from the dog (output shaft) to the wheel is biased in one direction. This backlash functions as a relief allowance in the rotational direction (the direction of an arrow 520) of the chamfer of the dog (output shaft). The dog tooth of the second rotary member on which the chamfer on the dog (output shaft) side is formed can move within the range of backlash which functions as a relief allowance. When the chamfer on the sleeve (input shaft) side keeps thrusting the chamfer on the dog (output shaft) side in the state in which the dog (output shaft)-side chamfer and sleeve (input shaft)-side chamfer come in contact with each other and eliminate the differential rotation, the dog (output shaft)-side chamfer is pushed down in the direction of the arrow 520. In this state, the dog (output shaft)-side chamfer is movable within the range of backlash.

This movement of the dog (output shaft)-side chamfer in the direction of the allow 520 is permitted within the range of backlash. When the sleeve (input shaft)-side chamfer thrusts the chamfer, therefore, the load which the sleeve (input shaft)-side chamfer receives from the dog (output shaft)-side chamfer reduces. The sleeve (input shaft)-side chamfer advances in the direction of an arrow 510, and in-gear is complete. The configuration of this embodiment can reduce the necessary load for moving the sleeve by the gear actuator without adding any torque (index torque) to the sleeve (input shaft) for the purpose of in-gear.

Comparative Example

Figure 6:
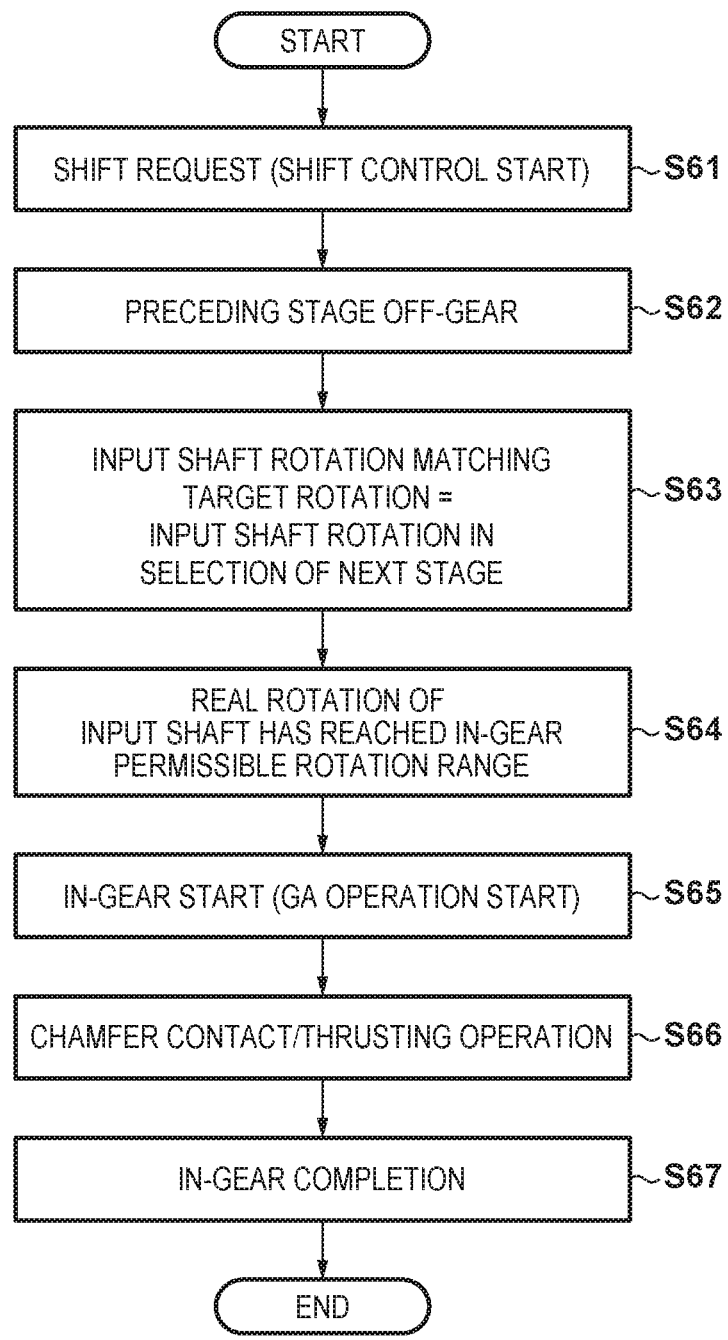
FIG. 6 is a flowchart showing a control procedure to be executed by a shift control apparatus according to a comparative example.

A comparative example of this embodiment will now be explained with reference to FIGS. 6 to 7B. FIG. 6 is a flowchart showing the control procedure of the comparative example. FIG. 7A is a timing chart corresponding to the control procedure. FIG. 7B is a schematic view showing the relative positional relationship between the chamfer of the sleeve 60*g* and the chamfer of the dog tooth 321 in the control procedure. FIG. 7B shows a case in which the spline 60*g*1 of the sleeve 60*g* engages with the dog tooth 321 of the first-speed drive gear 32 as an example.

(Steps S61 & S62)

Of the steps of the control procedure shown in FIG. 6, steps S61 and S62 are processes similar to those in steps S41 and S42 of FIG. 4 explained earlier. Also, processes 7A1 and 7A2 in FIG. 7A, which correspond to steps S61 and S62, and a state shown in 7Ba of FIG. 7B, are similar to processes 5A1 and 5A2 in FIG. 5A and the state shown in 5Ba of FIG. 5B.

(Step S63)

A process in step S63 is different from the process in step S43 of FIG. 4 explained earlier. In step S63 of FIG. 6, the engine controller 76 performs rotation control so that the rotational speed of the input shaft matches a predetermined rotational speed, but the setting of the target rotational speed of the input shaft is different from step S43 in FIG. 4. The process in step S63 corresponds to process 7A3 in the timing chart of FIG. 7A. In this step, the engine controller 76 sets a rotational speed equal to the rotational speed of the input shaft in selection of the next stage as the target rotational speed of the input shaft in rotation control. For example, the engine controller 76 can estimate the rotational speed of the input shaft by an estimating calculation which multiplies the real rotational speed of the output shaft by the target gear ratio. The engine controller 76 sets the input shaft rotational speed in selection of the next stage obtained based on the above estimating calculation as the target rotational speed of the input shaft in rotation control.

In the timing chart of FIG. 7A, a broken line 703 indicates the rotational speed of the input shaft in selection of the next stage, and a broken line 704 indicates the target rotational speed of the input shaft in rotation control. The engine controller 76 sets the input shaft rotational speed in selection of the next stage obtained based on the above estimating calculation as the target rotational speed of the input shaft in rotation control.

The target rotational speed of the input shaft indicated by the broken line 704 is set at the same rotational speed as that of the input shaft in selection of the next stage (the broken lines 703 and 704 overlap each other).

The engine controller 76 determines an in-gear permissible rotation range 705 by setting a predetermined range (target rotational speed±β) for the target rotational speed indicated by the broken line 704. By using the target rotational speed of the input shaft indicated by the broken line 704 as a median, for example, the engine controller 76 sets, as the in-gear permissible rotation range 705 in which in-gear operation start is permitted, a rotational speed range determined by the lower limit (target rotational speed−β) on the minus side with respect to the target rotational speed and the upper limit (target rotational speed+β) on the plus side with respect to the target rotational speed. The upper-limiting rotational speed (target rotational speed+β) of the in-gear permissible rotation range 705 is set at a rotational speed higher than the rotational speed of the input shaft in selection of the next stage indicated by the broken line 703.

In process 7A3, the actual gear stage is neutral (N), and the gear actuator (GA) is not in operation in a standby state. Also, input shaft rotation control by the engine controller 76 is in operation, and the actual rotational speed of the input shaft rises toward the in-gear permissible rotation range 705 (a solid line 702).

(Step S64)

In step S64, the engine controller 76 determines whether the real rotational speed of the input shaft has reached the in-gear permissible rotation range 705 based on the detection results from the input shaft rotation detectors (the first, second, and third rotational speed sensors 82, 84, and 86). If the real rotational speed of the input shaft has not reached the in-gear permissible rotation range 705, the engine controller 76 continues input shaft rotation control by engine control. If the real rotational speed of the input shaft has reached the in-gear permissible rotation range 705 in step S64, the engine controller 76 advances the process to step S65.

The timing chart in FIG. 7A shows a state in which the real rotational speed of the input shaft has reached the lower-limiting rotational speed of the in-gear permissible rotation range 705 at the timing of process 7A4.

(Step S65)

In step S65, the shift controller 74 operates the gear coupling mechanism 60 based on control of the gear actuator (GA) in order to shift the present neutral state to the in-gear state of the next stage (next-stage in-gear start). This process in step S65 corresponds to process 7A5 in the timing charge of FIG. 7A.

The shift controller 74 further moves the sleeve 60g from the neutral position to the right on the drawing surface via the shift fork 60e of the gear coupling mechanism 60 by controlling the gear actuator (GA). Since the sleeve 60g thus moves, the spline 60g1 of the sleeve 60g moves in the axial direction and approaches the dog tooth 321 of the first-speed drive gear 32.

In parallel to control of the gear actuator (GA) by the shift controller 74, the engine controller 76 performs rotation control so as to set the real rotational speed (the solid line 702) of the input shaft at the target rotational speed of the input shaft indicated by the broken line 704 (within the in-gear permissible rotation range 705). For example, if a deviation of the real rotational speed (the solid line 702) of the input shaft with respect to the target rotational speed of the input shaft indicated by the broken line 704 becomes equal to or smaller than a predetermined value, the engine controller 76 determines that setting is complete, and sets input shaft rotation control in a non-operation state. If the engine controller 76 determines that setting is complete, the process advances to step S66.

Note that although the engine controller 76 performs input shaft rotation control, if overshoot occurs with respect to the target rotational speed (the broken line 704) of the input shaft because the real rotational speed of the input shaft varies, the engine controller 76 may determine that setting is complete in a state in which the rotational speed is larger than the rotational speed (=the target rotational speed of the input shaft indicated by the broken line 704) of the input shaft in selection of the next stage indicated by the broken line 703 even within the in-gear permissible rotation range 705.

7Bb in FIG. 7B schematically shows the relative positional relationship between the chamfer on the sleeve (input shaft) side and that on the dog (output shaft) side in steps S63, S64, and S65 of the control procedure shown in FIG. 6 (processes 7A3 to 7A5 in FIG. 7A).

In shift control according to the comparative example, the target rotational speed of the input shaft is set at the same rotational speed as that of the input shaft in selection of the next stage. Therefore, if setting is performed in an undershoot state with respect to the target rotational speed of the input shaft, the relative relationship between the rotational speed of the sleeve (input shaft) and that of the dog (output shaft) differs from the relative relationship when performing setting in an overshoot state.

When performing setting in the undershoot state, the rotational speed of the dog (output shaft) becomes higher than that of the sleeve (input shaft) (a state of 7Bb—[A] in FIG. 7B). This state is the same as that shown in 5Bb of FIG. 5B.

On the other hand, when performing setting in the overshoot state with respect to the target rotational speed of the input shaft because the real rotational speed of the input shaft varies, the rotational speed of the sleeve (input shaft) becomes higher than that of the dog (output shaft) (a state of 7Bb—[B] in FIG. 7B).

(Step S66)

Referring to FIG. 6 again, in step S66, the shift controller 74 executes a chamfer contact/thrusting operation by controlling the gear actuator (GA). In the timing chart of FIG. 7A, the shift controller 74 executes the chamfer contact/thrusting operation at the timing of process 7A6. The shift controller 74 further moves the sleeve 60g to the right on the drawing surface via the shift fork 60e of the gear coupling mechanism 60 by controlling the gear actuator (GA). This movement of the sleeve 60g brings the inclined surface (chamfer) formed on the right end portion of the spline 60g1 of the sleeve 60g into contact with the inclined surface (chamfer) formed on the left end portion of the dog tooth 321 of the first-speed drive gear 32.

Since the chamfer of the sleeve 60g and that of the dog tooth 321 come in contact with each other, the differential rotation between the rotational speed of the sleeve 60g (the input shaft) and that of the dog tooth 321 (the output shaft) is eliminated. That is, the rotational speed of the sleeve 60g (the input shaft) and that of the dog tooth 321 (the output shaft) have the same value.

In this state in which there is no differential rotation between the rotational speed of the sleeve 60g (the input shaft) and that of the dog tooth 321 (the output shaft), the shift controller 74 further moves the sleeve 60g to the right on the drawing surface by controlling the gear actuator (GA). Since the sleeve 60g thus moves, the chamfer of the spline 60g1 of the sleeve 60g starts thrusting the chamfer of the dog tooth 321 of the first-speed drive gear 32. This thrust on the chamfer of the dog tooth 321 by the chamfer of the spline 60g1 progresses in accordance with the movement of the sleeve 60g.

(Step S67)

In step S67, since thrust on the chamfer of the dog tooth 321 by the chamfer of the spline 60g1 progresses, the spline 60g1 of the sleeve 60g and the dog tooth 321 of the first-speed drive gear 32 are meshed and integrated with each other, thereby completing shift to the in-gear state (in-gear completion).

7Bc in FIG. 7B is a view corresponding to the state of 7Bb—[B] in FIG. 7B, and schematically shows the relative positional relationship between the chamfer of the sleeve (input shaft) and that of the dog (output shaft) in steps S66 and S67 of FIG. 6 (processes 7A6 and 7A7 in FIG. 7A).

Note that when performing setting in the undershoot state (the state of 7Bb—[A] in FIG. 7B) shown in 7Bb of FIG. 7B, the process of the chamfer contact/thrusting operation and in-gear completion is the same as the process shown in 5Bc of FIG. 5B, so this process is omitted in 7Bc of FIG. 7B.

When performing setting in the overshoot state as shown in 7Bc of FIG. 7B, the rotational speed of the sleeve (input shaft) is higher than that of the dog (output shaft) in a state immediately before the chamfers come in contact with each other. Therefore, the chamfer (a preceding chamfer (not shown)) of the sleeve (input shaft) positioned in the upper portion of FIG. 7B rotates with no contact with the chamfer of the dog (output shaft) shown in 7Bc of FIG. 7B. A succeeding chamfer (shown in 7Bc of FIG. 7B) of the sleeve (input shaft) following the preceding chamfer (not shown) catches the chamfer of the dog (output shaft) shown in 7Bc of FIG. 7B based on the differential rotation, and comes in contact with the chamfer of the dog (output shaft) while advancing to the right along the axial direction. That is, in a state in which there is a differential rotation of rotational speed of sleeve (input shaft)>rotational speed of dog (output shaft), the chamfer of the sleeve (input shaft) easily comes in contact with the chamfer of the dot (output shaft) in the state as shown in 7Bc of FIG. 7B.

In the state shown in 7Ba and 7Bb of FIG. 7B, the total backlash (ΔB) of the individual elements from the dog (output shaft) to the wheel is biased in one direction. When the chamfer on the sleeve (input shaft) side keeps thrusting the chamfer on the dog (output shaft) side in the state in which the dog (output shaft)-side chamfer and sleeve (input shaft)-side chamfer come in contact with each other and eliminate the differential rotation, the dog (output shaft)-side chamfer is pushed up in the direction of the arrow 720. This direction of the arrow 720 is opposite to the direction in which the backlash (ΔB) is biased. Since the backlash (ΔB) does not function as a relief allowance in the rotational direction (the direction of the arrow 720) of the dog (output shaft)-side chamfer, the dog (output shaft)-side chamfer cannot move in the range of backlash.

In the case shown in 7Bc of FIG. 7B, as indicated by an arrow 710, it is necessary to add a torque (index torque) to the sleeve (input shaft) in a rotational direction perpendicular to the axial direction, thereby shifting the relative position of the sleeve (input shaft)-side chamfer with respect to the dog (output shaft)-side chamfer, and moving the sleeve in the axial direction by the gear actuator. In the case shown in 7Bc of FIG. 7B, the necessary load for obtaining the in-gear state increases when compared to that in the case shown in 5Bc of FIG. 5B.

That is, when performing power transmission by engaging the input shaft and output shaft of an automatic transmission in synchronism with each other, the configuration of this embodiment can reduce the load of the operation of engaging the input shaft and output shaft. In this operation of engaging the input shaft and output shaft, it is possible to reduce the load of contact between engaging portions (chamfers) of the input shaft and output shaft. It is also possible to execute a smoother engaging operation by reducing the contact load. This makes it possible to reduce contact noise generated by the contact of the engaging portions during the operation of engaging the input shaft and output shaft.

SUMMARY OF EMBODIMENT

Configuration 1

A shift control apparatus of an automatic transmission of this embodiment has the following configuration. That is, the shift control apparatus of the automatic transmission is a shift control apparatus of an automatic transmission configured to output a rotation of an input shaft to an output shaft by shifting the rotation, comprising an input detecting unit configured to detect a real rotational speed of the input shaft, an output detecting unit configured to detect a real rotational speed of the output shaft, an estimating unit configured to estimate an estimated rotational speed of the input shaft, which corresponds to a shift request, by multiplying the real rotational speed of the output shaft by a target gear ratio, and a control unit configured to control the rotation of the input shaft based on a detection result from the input detecting unit, wherein the control unit controls the rotation of the input shaft such that an upper-limiting rotational speed of a variation in real rotational speed of the input shaft is lower than the estimated rotational speed.

Configuration 2

A shift control apparatus of an automatic transmission of this embodiment has the following configuration. That is, the shift control apparatus of the automatic transmission is a shift control apparatus of an automatic transmission configured to output a rotation of an input shaft to an output shaft by shifting the rotation in accordance with a predetermined shift map, comprising an estimating unit configured to estimate an estimated rotational speed of the input shaft, which corresponds to a shift request, based on the shift map, an input detecting unit configured to detect a real rotational speed of the input shaft, a setting unit configured to set a target rotational speed lower than the estimated rotational speed such that an upper-limiting rotational speed of a variation in real rotational speed of the input shat is lower than the estimated rotational speed, and a control unit configured to control the rotation of the input shaft based on the target rotational speed and the detection result.

Configuration 3

There is provided the shift control apparatus described in configuration 1 or 2, wherein the automatic transmission includes a gear coupling mechanism configured to engage a first rotary member and a second rotary member in synchronism with each other, in order to transmit power between the first rotary member and the second rotary member rotatable around the same axis, the gear coupling mechanism includes a sleeve which includes a plurality of splines arranged along a circumferential direction of an inner circumferential surface, rotates together with the first rotary member by spline-fitting with the first rotary member via the plurality of splines, and is slidable in an axial direction with respect to the first rotary member, and a pushing unit configured to slide the sleeve during the synchronization by pushing the sleeve against the second rotary member, the second rotary member includes a plurality of dog teeth which are arranged along a circumferential direction of an outer circumferential surface of the second rotary member, and mesh with the plurality of splines when the sleeve slides toward the second rotary member, and the control unit controls the pushing unit to start an in-gear operation of sliding the sleeve toward the second rotary member, if it is determined based on the detection result from the input detecting unit that the rotational speed of the input shaft has reached a rotational speed range set lower than the estimated rotational speed.

Configuration 4

There is provided the shift control apparatus described in configuration 3, wherein in the in-gear operation, the control unit controls the pushing unit, and controls the rotation of the input shaft such that a rotational speed of the plurality of splines of the sleeve obtained via the first rotary member is lower than a rotational speed of the dog tooth of the second rotary member.

Configuration 5

There is provided the shift control apparatus described in configuration 3 or 4, wherein the control unit sets the rotational speed range lower than the estimated rotational speed based on a lower-limiting rotational speed on a minus side with respect to the target rotational speed of the input shaft, and an upper-limiting rotational speed on a plus side with respect to the target rotational speed.

Configuration 6

There is provided the shift control apparatus described in any one of configurations 3 to 5, wherein the dog tooth of the second rotary member and the plurality of splines have chamfers formed on end portions facing each other, and the control unit synchronizes rotations of the first rotary member and the second rotary member by bringing the chamfer formed on the end portion of the plurality of splines into contact with the chamfer formed on the end portion of the dog tooth of the second rotary member.

Configuration 7

There is provided the shift control apparatus described in configuration 6, wherein the dog tooth of the second rotary member has a backlash biased in one direction based on the rotation of the second rotary member, the control unit controls the pushing unit to further slide the sleeve in the axial direction in the in-gear operation, the chamfer of the dog tooth of the second rotary member is pushed by the chamfer of the plurality of splines as the sleeve slides in the axial direction, and the dog tooth of the second rotary member is configured to be movable within a range of the backlash based on the push.

In the configurations of the first and third aspects of the present invention, when transmitting power by synchronously engaging the input shaft and output shaft of the automatic transmission, the load of the operation of engaging the input shaft and output shaft can be reduced by performing control so that the rotation of the input shaft is lower than the estimated rotational speed.

In the configurations of the third to seventh aspects of the present invention, the load of contact between the engaging portions of the input shaft and output shaft can be reduced in the operation of engaging the input shaft and output shaft.

In the configurations of the third to seventh aspects of the present invention, it is possible to execute the engaging operation more smoothly by reducing the contact load, thereby reducing the contact noise generated by the contact of the engaging portions in the operation of engaging the input shaft and output shaft.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072516, filed Mar. 31, 2016, which is hereby incorporated by reference herein in its entirety.

What is claimed is:

1. A shift control apparatus of an automatic transmission configured to output a rotation of an input shaft to an output shaft by shifting the rotation, comprising:

an input detecting unit configured to detect a real rotational speed of the input shaft;

an output detecting unit configured to detect a real rotational speed of the output shaft;

an estimating unit configured to estimate an estimated rotational speed of the input shaft, which corresponds to a shift request, by multiplying the real rotational speed of the output shaft by a target gear ratio; and a control unit configured to control the rotation of the input shaft based on a detection result from the input detecting unit, wherein the control unit controls the rotation of the input shaft such that an upper-limiting rotational speed of a variation in real rotational speed of the input shaft is lower than the estimated rotational speed.

2. A shift control apparatus of an automatic transmission configured to output a rotation of an input shaft to an output shaft by shifting the rotation in accordance with a predetermined shift map, comprising:

an estimating unit configured to estimate an estimated rotational speed of the input shaft, which corresponds to a shift request, based on the shift map;

an input detecting unit configured to detect a real rotational speed of the input shaft;

a setting unit configured to set a target rotational speed lower than the estimated rotational speed such that an upper-limiting rotational speed of a variation in real rotational speed of the input shat is lower than the estimated rotational speed; and a control unit configured to control the rotation of the input shaft based on the target rotational speed and the detection result.

3. The apparatus according to claim 1, wherein the automatic transmission includes a gear coupling mechanism configured to engage a first rotary member of the input shaft and a second rotary member of the output shaft in synchronism with each other via engaging portions thereof, in order to transmit a torque between the first rotary member and the second rotary member rotatable around the same axis, the gear coupling mechanism includes:

a sleeve which includes, as the engaging portion, a plurality of splines arranged along a circumferential direction of an inner circumferential surface, rotates together with the first rotary member by spline-fitting with the first rotary member via the plurality of splines, and is slidable in an axial direction with respect to the first rotary member; and a pushing unit configured to slide the sleeve during the synchronization by pushing the sleeve against the second rotary member, the second rotary member includes, as the engaging portion, a plurality of dog teeth which are arranged along a circumferential direction of an outer circumferential surface of the second rotary member, and mesh with the plurality of splines when the sleeve slides toward the second rotary member, and the control unit controls the pushing unit to start an in-gear operation of sliding the sleeve toward the second rotary member, if it is determined based on the detection result from the input detecting unit that the rotational speed of the input shaft has reached a rotational speed range set lower than the estimated rotational speed.

4. The apparatus according to claim 3, wherein in the in-gear operation, the control unit controls the pushing unit, and controls the rotation of the input shaft such that a rotational speed of the plurality of splines of the sleeve obtained via the first rotary member is lower than a rotational speed of the dog tooth of the second rotary member.

5. The apparatus according to claim 3, wherein the control unit sets the rotational speed range lower than the estimated rotational speed based on a lower-limiting rotational speed on a minus side with respect to the target rotational speed of the input shaft, and an upper-limiting rotational speed on a plus side with respect to the target rotational speed.

6. The apparatus according to claim 3, wherein
the dog tooth of the second rotary member and the plurality of splines have chamfers formed on end portions facing each other, and
the control unit synchronizes rotations of the first rotary member and the second rotary member by bringing the chamfer formed on the end portion of the plurality of splines into contact with the chamfer formed on the end portion of the dog tooth of the second rotary member.

7. The apparatus according to claim 6, wherein
the dog tooth of the second rotary member has a backlash biased in one direction based on the rotation of the second rotary member,
the control unit controls the pushing unit to further slide the sleeve in the axial direction in the in-gear operation,
the chamfer of the dog tooth of the second rotary member is pushed by the chamfer of the plurality of splines as the sleeve slides in the axial direction, and
the dog tooth of the second rotary member is configured to be movable within a range of the backlash based on the push.

8. The apparatus according to claim 2, wherein
the automatic transmission includes a gear coupling mechanism configured to engage a first rotary member of the input shaft and a second rotary member of the output shaft in synchronism with each other via engaging portions thereof, in order to transmit a torque between the first rotary member and the second rotary member rotatable around the same axis, the gear coupling mechanism includes:

a sleeve which includes, as the engaging portion, a plurality of splines arranged along a circumferential direction of an inner circumferential surface, rotates together with the first rotary member by spline-fitting with the first rotary member via the plurality of splines, and is slidable in an axial direction with respect to the first rotary member; and a pushing unit configured to slide the sleeve during the synchronization by pushing the sleeve against the second rotary member, the second rotary member includes, as the engaging portion, a plurality of dog teeth which are arranged along a circumferential direction of an outer circumferential surface of the second rotary member, and mesh with the plurality of splines when the sleeve slides toward the second rotary member, and the control unit controls the pushing unit to start an in-gear operation of sliding the sleeve toward the second rotary member, if it is determined based on the detection result from the input detecting unit that the rotational speed of the input shaft has reached a rotational speed range set lower than the estimated rotational speed.

9. The apparatus according to claim 4, wherein the control unit sets the rotational speed range lower than the estimated rotational speed based on a lower-limiting rotational speed on a minus side with respect to the target rotational speed of the input shaft, and an upper-limiting rotational speed on a plus side with respect to the target rotational speed.

10. The apparatus according to claim 4, wherein
the dog tooth of the second rotary member and the plurality of splines have chamfers formed on end portions facing each other, and
the control unit synchronizes rotations of the first rotary member and the second rotary member by bringing the chamfer formed on the end portion of the plurality of splines into contact with the chamfer formed on the end portion of the dog tooth of the second rotary member.

11. The apparatus according to claim 5, wherein
the dog tooth of the second rotary member and the plurality of splines have chamfers formed on end portions facing each other, and
the control unit synchronizes rotations of the first rotary member and the second rotary member by bringing the chamfer formed on the end portion of the plurality of splines into contact with the chamfer formed on the end portion of the dog tooth of the second rotary member.

* * * * *